United States Patent [19]

Brown

[11] 3,740,691
[45] June 19, 1973

[54] ELECTRIC BRAKE CONTROLLER
[75] Inventor: Donald D. Brown, Dearborn Heights, Mich.
[73] Assignee: Kelsey-Hayes Company, Romulus, Mich.
[22] Filed: June 1, 1971
[21] Appl. No.: 148,784

[52] U.S. Cl.......................... 338/39, 338/92, 338/96
[51] Int. Cl............................................ H01c 13/00
[58] Field of Search.................. 338/39, 92, 93, 95, 338/96, 97, 153, 202

[56] References Cited
UNITED STATES PATENTS
3,328,739   6/1967   McInnis et al........................ 338/96
3,524,159   8/1970   Kilbourn............................ 338/96 X
3,304,531   2/1967   McInnis.............................. 338/96
1,660,161   2/1928   Hansen............................... 338/96

Primary Examiner—C. L. Albritton
Attorney—Harness, Dickey & Pierce

[57] ABSTRACT

An electric brake controller having a wound resistor and having an elongated electrical contact strip which is supported at both ends with the strip being engaged with a movable contact member intermediate its support ends whereby the contact strip successively engages the turns on the resistor to vary the current to the brakes.

26 Claims, 5 Drawing Figures

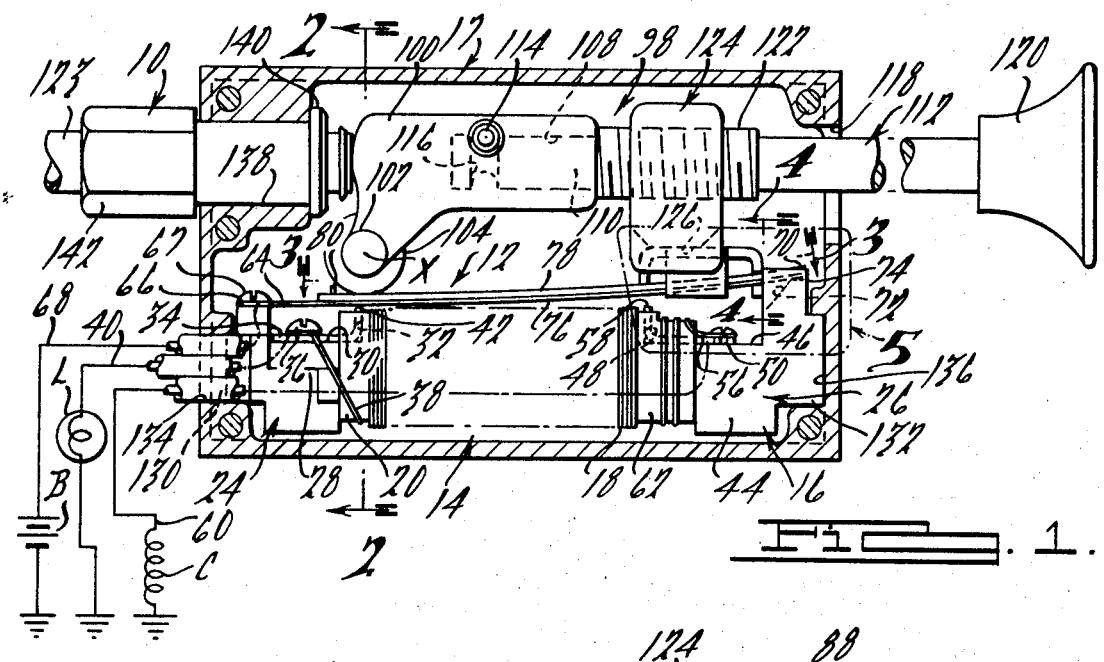

ELECTRIC BRAKE CONTROLLER

SUMMARY — BACKGROUND OF THE INVENTION

The present invention relates to electric brake controllers generally of the type shown and described in the U.S. Pat. to Ross No. 2,829,225 issued Apr. 1, 1958.

In the present invention a novel flexible conductor and support therefor are utilized which results in an improved and simplified brake controller and which further results in a compact assembly. At the same time the brake controller, which is operative from fluid pressure from a main hydraulic brake system, requires a very little volume of fluid. In addition the flexible conductor is actuated by an actuating lever which is supported in a novel manner.

Therefore, it is a general object of the present invention to provide a new and improved brake controller.

It is another object to provide a new and improved electric brake controller having a new and improved flexible conductor and support.

It is another object to provide a new and improved electric brake controller which is of a simplified, compact construction and which requires only a small volume of brake fluid.

Other objects, features, and advantages of the present invention will become apparent from the subsequent description and the appended claims, taken in conjunction with the accompanying drawing, in which:

FIG. 1 is a composite electrical circuit diagram and front elevational view of a preferred form of electric brake controller;

FIGS. 2, 3 and 4 are sectional views of the brake controller of FIG. 1 taken generally along the lines 2—2, 3—3, and 4—4, respectively; and FIG. 5 is an enlarged sectional view enclosed by the dotted lines indicated by the numeral 5.

Looking now to FIG. 1 an electromagnetic brake coil C for an electrically actuated brake for a trailer (or the like) is energized with current from a battery B. The battery B can be mounted on a towing vehicle having conventional hydraulically actuated brakes. To provide synchronism between application of the towing vehicle brakes and electric trailer brakes a hydraulically actuated piston assembly 10 is connected to the hydraulic brake system of the towing vehicle. The piston assembly 10 actuates a movable flexible conductor strip assembly 12 into successive contact with adjacent turns or coils on a wound resistor assembly 14. The conductor assembly 12 and coils of the wound resistor assembly 14 are in series circuit with the battery B and coil C. As the pressure to the piston assembly 10 is increased the conductor assembly 12 engages more of the turns of the resistor assembly 14 whereby the series resistance in the circuit of coil C will be decreased resulting in an increase in current and hence in an increase in brake effect. The resistor assembly 14 comprises a dielectric core member 16 which is supported in a rectangular box-like housing 17 and upon which is wound a control winding 18. A generally flat cover 19 closes the housing 17. The core member 16 has a generally circularly sectioned, straight center section 20 which is formed with a helical groove 22 in which the control winding 18 is continuously wound. The groove 22 thus maintains adjacent turns of the control winding 18 spaced from each other. Generally rectangularly shaped sections 24 and 26 are located at opposite ends of center section 20. The end section 24 has a depressed portion 28 which has a support surface 30 which extends into a notch 32 located in the adjacent end of center section 20. A generally flat electrical contact member 34 is secured to support surface 30 via fastener 36. The contact member 34 is connected to one end of the control winding 18 via conductor 38 and at the same time is connected to the brake light L via conductor 40. The contact member 34 has a transversely extending contact tab 42 which serves as one contact of a brake light switch in a manner to be seen.

The opposite end section 26 is formed somewhat similarly to end section 24 and has a depressed portion 44 which has a support surface 46 which extends into a notch 48 located in the adjacent end of center section 20. A generally flat electrical contact member 50 is secured to support surface 46 via fastener 54. The contact member 50 is connected to the opposite end of the control winding 18 via conductor 56. The contact member 50 has a transversely extending contact, stop tab 58. The contact member 50 is electrically connected to the electromagnetic brake coil C via conductor 60. The end portion 62 of the center section 20 adjacent the end section 26 is depressed at its upper end whereby the last turns of the control winding 18 wound on the end portion 62 are located below the level of the remaining turns; this serves a purpose to be described. Energization of the control winding 18 is made via the conductor assembly 12 in a manner to be seen.

One end 64 of the conductor assembly 12 is fixed via a fastener 67 to a raised support surface 66 located next to the depressed portion 28 on the core member 16. The end 65 of the conductor assembly 12 is also connected to the positive terminal of battery B via conductor 68. The conductor assembly 12 extends from its end 65 generally across the resistor assembly 14 and hence across the control winding 18 and has its opposite end 70 slidably supported in a slot 72 in a raised portion 74 located next to the depressed portion 44 of core member 16. The conductor assembly 12 as supported at its opposite ends 65 and 70 is normally held out of engagement with the control winding 18 and the contact tabs 42 and 58. As will be seen the conductor assembly 12 can be flexed or deflected into engagement with successive ones of the coils of the control winding 18 to thereby controllably vary the magnitude of the current to the electromagnetic brake coil C and hence to controllably vary the braking effect.

The conductor assembly 12 is made of two pieces, a relatively thin gage flat, elongated contactor member 76 and a heavier gage flat elongated support member 78. Both the members 76 and 78 are made of a resilient material with the contactor member 76 being made of a material which is a good conductor of electricity, such as springhard, phosphor bronze, and with the heavier gage support member 78 being made of a spring steel such as SAE 1065 (Rc 46-49).

The contactor member 76 and support member 78 are held together with the support member 78 overlaying a portion of the contactor member 76. The contact member 76 has an upwardly extending tang 80 which is spaced from the end 65 and which engages a slot 82 at the end of support member 78. The contactor member 76 and support member 78 have longitudinally elongated openings 84 and 86, respectively, which partially overlap each other when the support member 78 engages the tang 80. A load block 88 is provided with a pair of side legs 90 which straddle the conductor assembly 12 near its end 70; the block 88 has a pressure leg 92 which is shorter than side leg 90 and which is adapted to engage the support member 78. A leg 94, located opposite leg 92 has a locking tab 96 adapted to be received sideways within the openings 84 and 86 and then rotated to hold the members 76 and 78 together. When the support member 78 is positioned with the slot 82 receiving the tang 80 (in conductor member 76) the openings 84 and 86 partially overlap to lightly grip the tab 94 to thereby secure the assembly of the load block 88 to the conductor assembly 12. In this position the pressure leg 92 is located generally in confrontation with the stop tab 58 and functions to stop deflection of conductor assembly 12 when the leg 92 has moved conductor assembly 12 into engagement with stop tab 58. The conductor assembly 12 is actuated by forces applied to the load block 88 via a lever arm assembly 98. The lever arm assembly 98 includes a pivot member 100 which has a pair of oppositely extending pin portions 102 which are journalled in aligned bosses 104 and 106 located in the housing 17 and the cover 19, respectively, whereby pivot member 100 will pivot about an axis X. The pivot member 100 has an opening 108 which receives an end portion 110 of an actuating rod 112; a pin 114 in slot 116 axially retains the rod 112 to pivot member 100 while permitting relative rotation, which serves a purpose to be seen. The actuating rod 112 extends outwardly through a slot 118 in the side wall of housing 17 and terminates in a knob 120 at its outer end which facilitates gripping and manual operation by the vehicle operator.

The actuating rod 112 has a threaded portion 122 located intermediate its end and upon which is threaded a load control member 124. The control member 124 has a slot 126 adapted to receive the load block 88. Thus as the lever arm assembly 98 is pivoted about the axis X the control member 124 applies an actuating force to the load block 88 whereby the conductor assembly 12 will be deflected towards the resistor assembly 14 to engage the brake coil C. The piston assembly 10 is fixed to the housing 17 at a point slightly above the axis X and in a position to engage the pivot member 100. Thus the lever arm assembly 98 can be actuated by hand by the vehicle operator via knob 120 or automatically and coincidentally with the hydraulic brakes of the towing vehicle via the piston assembly 10. The piston assembly 10 is connected to the brake system of the towing vehicle via a conduit 123. Note that the distance from the point of force application of piston assembly 10 onto pivot member 100 from the axis X is substantially less than the distance from axis X to the point of engagement between control member 124 and load block 88. This provides a mechanical advantage of travel for the piston of the piston assembly 10 such that the amount of fluid displacement required is small hence requiring only a small amount of brake fluid to be taken from the hydraulic brake system of the towing vehicle. The noted mechanical advantage can be selectively varied by varying the position of the control member 124 along the threaded portion 122 of actuating rod 112 whereby the point of load application on load block 88 will be varied. This permits adjustment or calibration to provide the desired braking effect in response to the brake hydraulic pressure at piston assembly 10. The position of control member 124 can be varied simply by rotating the actuating rod 112.

As noted the conductor assembly 12 is normally spaced from and extends over the control winding 18. Since the support surface 66 at end section 24 is slightly lower than the opposite support surface of slot 72 at opposite end section 26, the end 65 of conductor assembly 12 will be located closer to control winding 18 than the opposite end 70. Thus when the conductor assembly 12 is actuated and flexed towards the control winding 18, the separate coils will be successively contacted one at a time to provide for a gradual variation in the resistance provided by control winding 18 in series with brake coil C whereby to provide for a gradual variation in magnitude of current to coil C and hence of brake effect.

The contact tab 42 of contact member 34 and tab 58 of opposite contact member 50 extend upwardly to positions generally level or in line with the upper extremity of the coils of control winding 18. Thus when conductor assembly 12 is first actuated the contact member 76 will first engage the contact tab 42. This will result in the brake light L being energized via conductor 40 and the brake coil C being energized via all of the turns of the control winding 18 and conductor 60. As the conductor assembly 12 is flexed further the coils or turns of control winding 18 will be successively engaged by contactor member 76 resulting in a gradual reduction in series resistance of control winding 18 and in an increase in energizing current to coil C; this corresponds to higher braking effect as demanded by the vehicle operator in the towing vehicle resulting from higher applied, hydraulic brake pressure. At or near the maximum applied hydraulic pressure the contactor member 76 will be flexed into engagement with stop tab 58. In this position the control winding 18 is shunted out of the circuit and maximum current is applied to the brake coil C. Note that the depressed coils or turns on end portion 62 are never contacted by contactor member 76 and remain in the series circuit until the stop tab 58 is engaged. These turns are selected to have a sufficient impedance to limit the maximum current through the last turn contacted by contactor member 76 whereby that last turn is protected from damage which might result from excessive current if that were the only impedance remaining in series with coil C.

Note that the support member 78 is spaced from and is not connected to the support surface 66 to which the thin gage conductor member 76 is fixed. The thin gage conductor member 76 will be easily flexed or bent to provide for initial low level brake application and brake light energization at a low magnitude of brake pressure at piston assembly 10. Thereafter the flexing of conductor assembly 12 will be determined more by the combined bending effects of both the contactor member 76 and the support member 78. Note that the conductor assembly 12 acts as a spring with its rate being generally determined by the material and thickness of the members 76 and 78; the spring rate is selected to provide proper brake energization in response to variation in brake pressure at piston assembly 10 and also, of course, provides for return when the brake pressure is decreased. Note that the support surface 72 is tapered at its leading end. This facilitates flexing of the end 70 of conductor assembly 12 which is freely supported there.

The core member 16 is provided with extensions 130 and 132 at opposite ends which interfit into mating slots 134 and 136 in the housing 17. The slot 134 is open and provides clearance with extension 134 for feeding the necessary conductors 40, 60 and 68 in the housing 17 for their respective connections. Also the piston assembly 10 is held in a semi-circular slot 138 in the housing 17. The piston assembly 10 is held from axial movement by cylinder bosses 140 and 142. The cover 19 has a projection 144 which fits partially in the slot 134 in housing 17 and when assembled to the housing 17 the projection 144 pinches the conductors 40, 60 and 68 to hold them securely and provide a strain relief connection. At the same time the core member 16 is clamped in place by the action of projection 144 of the cover 19 against conductors 40, 60 and 68; the cover 19 also closes the opposite slot 136 to further hold the core 16 in place. The cover 19 also is provided with a semi-circular slot portion 146 which mates with slot 138 in housing 17 to capture the piston assembly 10 in place. The cover 19 also operates to close the slot 118 to hold the rod 112 in place. As previously noted the lever arm assembly 98 is held by the action of bosses 104 and 106 and pin portions 102. Thus note that the assembly of the components of the controller is greatly simplified and requires no fasteners; the components are merely located in their proper positions in the housing 17 and are held there by the interaction of the cover 19 when it is fastened to the housing 17.

With the construction as shown, the conductor assembly 12 can be of a simple construction with both members 76 and 78 being flat in contour; with the conductor assembly 12 mounted as a beam supported at both ends, a simplified controller assembly can be provided. In addition the controller assembly can be compact.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. An electric brake controller for controlling the magnitude of current to electrically actuated brakes, comprising: resistor means comprising a control winding wound about a longitudinally extending axis, conductor means comprising a flexible conductor extending longitudinally relative to said axis and spaced from said control winding, support means generally fixed relative to said control winding for supporting said flexible conductor as a beam at both ends, and actuating means operatively connected with said conductor means for applying a force to said conductor at a location intermediate said ends whereby said conductor engages the coils of said control winding as a result of beam bending of said conductor.

2. The controller of claim 1 with said support means supporting said flexible conductor freely at at least one end.

3. The controller of claim 2 with said support means fixing the opposite end of said flexible conductor.

4. The controller of claim 1 with said flexible conductor comprising a flexible electrical conductor strip made of a material being a good conductor of electricity and a support strip and securing means securing said conductor strip and said support strip together.

5. The controller of claim 1 with said flexible conductor comprising a flexible electrical conductor strip made of a material being a good conductor of electricity and a flexible support strip and securing means securing said conductor strip and said support strip together, said support strip partially overlaying said conductor strip whereby said support strip is directly supported by said support means at only one of said ends.

6. The controller of claim 1 with said support strip being of a shape similar to that of said conductor strip and with said support strip and said conductor strip both being flat strips.

7. The controller of claim 1 with said resistor means including an electrical stop member located near a first end of said control winding, said actuating means connected for applying the force to said flexible conductor at a location generally between said first end and one of said ends of said flexible conductor.

8. An electric brake controller for controlling the magnitude of current to electrically actuated brakes for a vehicle, comprising: resistor means comprising a control winding wound about a longitudinally extending dielectric body, a first tab supported at one end of said dielectric body and being electrically connected to one end of said control winding, a second tab supported at the opposite end of said dielectric body and being electrically connected to the opposite end of said control winding and to the electrically actuated brake, conductor means comprising a flexible conductor extending longitudinally with said dielectric body and spaced from said control winding, support means on said dielectric body generally fixed relative to said control winding for supporting said flexible conductor as a beam at both ends, and actuating means operatively connected with said conductor means for applying a force to said conductor at a location intermediate the ends of said conductor to bend said conductor as a beam into engagement successively with said first tab, with adjacent turns of said control winding and finally with said second tab.

9. The controller of claim 8 with said actuating means comprising a pivotally supported lever arm actuable when pivoted to flex said conductor.

10. The controller of claim 9 for use with the hydraulic brake system of a towing vehicle for towing the electrically braked vehicle, and with said actuating means further comprising a piston connected to said hydraulic brake system and to said lever arm for pivoting said lever arm in response to fluid pressure in the hydraulic brake system.

11. The controller of claim 9 further comprising a box-like case and a generally flat cover for housing said resistor means, said conductor means and said actuating means and including a pair of bosses in said case and in said cover receiving a pair of pin portions on said lever arm for pivotally supporting said lever arm.

12. The controller of claim 9 with said dielectric body including a depressed portion containing the last turns of said control winding with said depressed portion following said second tab and with said last turns being out of contact position with said flexible conductor.

13. The controller of claim 12 with said support means supporting said flexible conductor freely at at least one end.

14. The controller of claim 13 with said support means fixing the opposite end of said flexible conductor.

15. The controller of claim 14 with said flexible conductor comprising a flexible electrical conductor strip made of a material being a good conductor of electricity and a support strip and securing means securing said conductor strip and said support strip together.

16. The controller of claim 14 with said flexible conductor comprising a flexible electrical conductor strip made of a material being a good conductor of electricity and a support strip and securing means securing said conductor strip and said support strip together, said support strip being of a shape similar to that of said conductor strip and partially overlaying said conductor strip whereby said support strip is directly supported by said support means at only one of said ends, said support strip and said conductor strip both being flat strips.

17. The controller of claim 16 with said support strip being of a heavier gage material than said conductor strip.

18. The controller of claim 17 with said securing means comprising a contact block located on said conductor generally in confrontation with said second tab, said actuating means further comprising an actuating block movably supported on said lever arm and engageable with said contact block for actuating said conductor.

19. The controller of claim 11 comprising first means on said body and said housing for slidably supporting said body in said housing whereby said body can be slidingly assembled in said housing, and second means on said cover for clamping said body in said housing when said cover is assembled to said housing.

20. The controller of claim 10 further comprising a box-like case and a generally flat cover for housing said resistor means, said conductor means and said actuating means and including a pair of bosses in said case and in said cover receiving a pair of pin portions on said lever arm for pivotally supporting said lever arm, first means on said body and said housing for slidably supporting said body in said housing whereby said body can be slidingly assembled in said housing, and second means on said cover for clamping said body in said housing when said cover is assembled to said housing, third means on said piston and said housing for slidably supporting said piston in said housing whereby said piston can be slidingly assembled in said housing, and fourth means on said cover for clamping said body in said housing when said cover is assembled to said housing.

21. An electric brake controller for controlling the magnitude of current to electrically actuated brakes for a vehicle, comprising: resistor means including a control winding wound about a longitudinally extending dielectric body, conductor means comprising a flexible conductor supported on said dielectric body, and actuating means operatively connected with said conductor means for moving said conductor into engagement with said control winding, a housing comprising a box-like case and a cover, first means on said body and said housing for slidably supporting said body in said housing whereby said body can be slidingly assembled in said housing, and second means on said cover for clamping said body in said housing when said cover is assembled to said housing.

22. The controller of claim 21 for use with the hydraulic brake system of a towing vehicle for towing the electrically braked vehicle, and with said actuating means further comprising a pivotally supported lever arm actuable when pivoted to move said conductor into engagement with said control winding, said actuating means further comprising a piston connected to said hydraulic brake system and to said lever arm for pivoting said lever arm in response to fluid pressure in the hydraulic brake system, third means on said piston and said housing for slidably supporting said piston in said housing whereby said piston can be slidingly assembled in said housing, and fourth means on said cover for clamping said body in said housing when said cover is assembled to said housing.

23. The controller of claim 22 further comprising a box-like case and a generally flat cover for housing said resistor means, said conductor means and said actuating means and including a pair of bosses in said case and in said cover receiving a pair of pin portions on said lever arm for pivotally supporting said lever arm.

24. The controller of claim 21 with said actuating means including a pivotally supported lever arm actuable when pivoted to move said conductor into engagement with said control winding, said actuating means further comprising a box-like case and a generally flat cover for housing said resistor means, said conductor means and said actuating means and including a pair of bosses in said case and in said cover receiving a pair of pin portions on said lever arm for pivotally supporting said lever arm.

25. An electric brake controller for controlling the magnitude of current to electrically actuated brakes comprising: resistor means comprising a control winding wound about a longitudinally extending axis, conductor means comprising a flexible conductor extending longitudinally relative to said axis and spaced from said control winding, means for supporting said conductor means contiguous to at least one of its ends, said conductor means having a more flexible portion contiguous to said one end than the remaining portion of said conductor means, and actuating means operatively connected with conductor means for applying a force to said conductor means at a location spaced from said end for deflecting said conductor means into engagement of the coils of said control winding.

26. An electric brake controller as set forth in claim 25 wherein the conductor means comprises a flexible electrical conductor strip and a support strip secured to said conductor strip, said support strip having one end spaced from the point of support of the one end of said conductor means for providing the more flexible section of said conductor means.

* * * * *